United States Patent
Kruis et al.

(10) Patent No.: US 10,022,697 B2
(45) Date of Patent: Jul. 17, 2018

(54) ARC REACTOR AND PROCESS FOR PRODUCING NANOPARTICLES

(71) Applicant: Universitaet Duisburg Essen, Essen (DE)

(72) Inventors: Frank Einar Kruis, Emmerich (DE); Matthias Stein, Muehlheim an der Ruhr (DE); Jeremias Geiss, Weinstadt (DE)

(73) Assignee: Universitaet Duisburg Essen, Essen (DE)

( * ) Notice: Subject to any disclaimer, the term of this patent is extended or adjusted under 35 U.S.C. 154(b) by 113 days.

(21) Appl. No.: 14/875,310

(22) Filed: Oct. 5, 2015

(65) Prior Publication Data
US 2016/0101402 A1    Apr. 14, 2016

(30) Foreign Application Priority Data

Oct. 14, 2014    (DE) .................. 10 2014 220 817

(51) Int. Cl.
| | | |
|---|---|---|
| *B01J 19/08* | (2006.01) | |
| *B01J 8/00* | (2006.01) | |
| *C01G 1/02* | (2006.01) | |

(52) U.S. Cl.
CPC .......... *B01J 19/088* (2013.01); *B01J 8/0045* (2013.01); *C01G 1/02* (2013.01);
(Continued)

(58) Field of Classification Search
None
See application file for complete search history.

(56) References Cited

U.S. PATENT DOCUMENTS 2,573,057 A * 10/1951 Porter ................ C01B 33/182
                                                                422/186
2,862,792 A    12/1958 Rehm
(Continued)

FOREIGN PATENT DOCUMENTS

| DE | 69907933 T2 | 1/2004 |
| WO | 2008/145601 A1 | 12/2008 |

OTHER PUBLICATIONS

Henning Forster et al., "Experimental study of metal nanoparticle synthesis by an arc evaporation/condensation process", Springer Science+Business Media B.V. 2012, published online Jun. 12, 2012.
Hontañón, Esther, et al, "The transition from spark to arc discharge and its implications with respect to nanoparticle production", J. Nanopart Res, 15:1957 (2013), 19 pages.
(Continued)

*Primary Examiner* — Kishor Mayekar
(74) *Attorney, Agent, or Firm* — Greer, Burns & Crain, Ltd.; Steven P. Fallon

(57) ABSTRACT

An arc reactor and a process for the production of nanoparticles are disclosed. The reactor has a crucible in a gas-tight housing having a carrier gas inlet and a spaced-apart carrier gas outlet. The carrier gas inlet is directed to the side of the crucible opposite the crucible opening. The inlet can be disposed below the crucible and directed to the side of the crucible opposite the crucible opening. The carrier gas outlet is disposed above the crucible and exits the housing above the crucible. The carrier gas outlet is formed by a hood disposed at a distance above the crucible, which is separated from the crucible and formed by an exhaust pipe that connects the hood to the carrier gas outlet of the housing. The reactor housing has at least one inlet for cooling gas. This can be directed at an interstice formed between the crucible and the hood.

6 Claims, 8 Drawing Sheets

(52) U.S. Cl.
CPC ...... *B01J 2219/0809* (2013.01); *B01J 2219/0826* (2013.01); *B01J 2219/0841* (2013.01); *B01J 2219/0869* (2013.01); *B01J 2219/0871* (2013.01); *B01J 2219/0879* (2013.01); *B01J 2219/0894* (2013.01); *C01P 2004/64* (2013.01)

(56) References Cited

U.S. PATENT DOCUMENTS

| | | |
|---|---|---|
| 3,194,634 A | 7/1965 | Yelkin et al. |
| 3,232,706 A | 2/1966 | Kuhn |
| 5,665,277 A | 9/1997 | Johnson et al. |
| 6,379,419 B1 | 4/2002 | Celik et al. |
| 2008/0006954 A1 | 1/2008 | Yubuta et al. |
| 2014/0110240 A1* | 4/2014 | Mennell .......... C10B 49/02 201/39 |

OTHER PUBLICATIONS

Kiesler, D., et al., "Plasma synthesis of titanium nitride, carbide and carbonitride nanoparticles by means of reactive anodic arc evaporation from solid titanium", J. Nanopart. Res. 17:152, (2015), 13 pages.

Stein, Matthias, et al., "Effect of carrier gas composition on transferred arc metal nanoparticle synthesis", J. Nanopart Res., 15:1400, (2013), 14 pages.

Stein, Matthias, et al., "Adjustment and Online Determination of Primary Particle Size in Transferred Arc Synthesis of Copper Nanoparticles", Aerosol Science and Technology, 47, (2013), pp. 1276-1284.

Stein, Matthias, et al., "Effect of carrier gas composition on transferred arc metal nanoparticle synthesis", J. Nanopart Res, 15:1400, Jan. 10, 2013, (14 pages).

* cited by examiner cross-section A-A cross-section B-B cross-section B-B

ARC REACTOR AND PROCESS FOR PRODUCING NANOPARTICLES

The present invention relates to an electric arc reactor and a process which can be performed with it for producing nanoparticles, which preferably runs continuously. The process and the reactor adapted for the process are preferably characterized by the fact that nanoparticles can be produced with low input of energy and raw materials. The nanoparticles may comprise metal, nonmetal and mixtures of these or consist of them, preferably in the non-oxidized form (oxidation state 0). The nanoparticles produced by the process and by means of the arc reactor, respectively, preferably have a size distribution of 25-250 nm and/or a mean size in the range of 80 nm e.g. for $Cu^0$ or 100 nm for $Ag^0$, 20 nm for $Al^0$, 18 nm for TiN. The process is characterized by a low mass-specific energy consumption and preferably a high production rate. The reactor is adapted for a continuous process and in a preferred embodiment is characterized by a simple structure that allows uninterrupted continuous operation, e.g. over at least 8 h, preferably at least 24 h or at least 72 h.

STATE OF THE ART

Stein et al., Aerosol Science and Technology 1276-1284 (2013), describes a generic arc reactor for producing nanoparticles of copper, in which a flow controller regulates the carrier gas that flows into the reactor below a crucible and is extracted above the crucible through a pipe that is formed as a single piece with the crucible and has an opening for the cathode. The crucible forms the anode and it is refilled through the pipe with metal granules, said pipe being a single piece with the crucible.

Stein et al., J. Nanopart Res. (2013) 15:1400, describes a generic arc reactor for producing nanoparticles of copper, in which a graphite crucible as an anode is held on a titanium rod. A carrier gas is either allowed to flow from one side horizontally over the crucible and discharged oppositely, or allowed to flow from below the crucible into the reactor and is discharged through a discharge outlet disposed above the crucible.

OBJECT OF THE INVENTION

The object of the invention is to specify an alternative arc reactor and a process that can be used to produce nanoparticles, in particular nanoparticles of small size and/or of narrow size distribution. Preferably, the arc reactor and the process performed with it, respectively, are suitable for a continuous production process. Preferably, using the reactor and/or process, it shall be possible to produce nanoparticles with low specific consumption of energy and auxiliary materials.

DESCRIPTION OF THE INVENTION

The invention achieves the object by features of claims, in particular by an arc reactor and a process for the production of nanoparticles that can be carried out with it. The reactor has a crucible in a gas-tight housing having a carrier gas feed and spaced apart therefrom a carrier gas outlet. The carrier gas feed is a carrier gas inlet and it is directed onto the side of the crucible opposite the crucible opening, in particular, the carrier gas feed is disposed below the crucible and is directed at the side of the crucible opposite the crucible opening. The carrier gas outlet is disposed above the crucible and exits the housing above the crucible. Preferably, the carrier gas outlet is disposed opposite the carrier gas feed in the housing. The reactor is characterized in that the carrier gas outlet is formed by a hood disposed at a distance above the crucible, which hood is separated from the crucible, and by an exhaust pipe that connects the hood with the carrier gas outlet of the housing. Preferably, the exhaust pipe carries the hood with little contact, e.g. by means of at least two radial protrusions or by means of a circumferential protrusion around the exhaust pipe, which are attached to a first end of the exhaust pipe and on which the hood lies with its small opening facing away from the crucible and/or from its terminal cross-section to impede thermal conduction from the hood to the exhaust pipe. Further preferred, the exhaust pipe is mounted at its second end opposite the hood at a distance from the housing, more preferred carried on an outlet pipe adjacent to the housing. The outlet pipe is connected gas-tight to the housing. The carrier that supports the exhaust pipe on the housing or on the outlet pipe, can e.g. be a flat element, e.g. a sheet metal or a ceramic disc that engages in opposite recesses in the outer wall of the exhaust pipe and at a distance from the exhaust pipe rests on a protrusion that protrudes into the housing or into the exhaust pipe. Such a protrusion can, e.g. be formed by a ring that is disposed gas-tight in a flange connection of the outlet pipe. The small material cross-section and the small contact surface of the carrier of the exhaust pipe to the housing or to the outlet pipe, respectively, prevents an effective thermal conduction to the outlet pipe and preferably allows an outlet pipe without special cooling, e.g. a single-walled outlet pipe with cooling only by room air. Hood and exhaust pipe preferably consist of graphite.

The hood has a terminal cross-section that faces the crucible and preferably at least spans the opening of the crucible, wherein the terminal cross-section of the hood preferably has a cross-section with a diameter of at least 1.5-fold, more preferably at least 2-fold or 2.5-fold greater than the diameter of the crucible opening. The terminal cross-section of the hood and the crucible opening are preferably circular. Generally preferred, crucible, crucible opening, hood and/or exhaust pipe are formed rotationally symmetrical about a common axis.

The crucible preferably consists of graphite and is tapered below its crucible opening and attached to a cathode, preferably supported by a cathode, e.g. put up on a vertical cathode by means of a recess. The taper of the crucible below its opening reduces the thermal flow from the crucible opening to the cathode. An anode is disposed at a distance to the crucible, especially in a distance above the crucible opening. Preferably, the anode ends in the interstice that is formed by the distance between the crucible and the hood. The anode may be disposed e.g. in parallel to the crucible opening level, e.g., horizontally.

The housing has a distance from the crucible and from the hood in order to avoid an excessive heating of the housing. Preferably, the housing is cooled, e.g. by means of a double jacket through which a cooling medium can flow and in which a cooling medium flows during the process.

The hood allows discharge of the exhaust gas with the nanoparticles contained therein and reduces losses that occur, e.g. occurring by deposition of nanoparticles at the housing when e.g. no exhaust pipe conveys the exhaust gas to the carrier gas outlet. The hood reduces also losses arising within an exhaust pipe by deposition of nanoparticles, e.g. if an exhaust pipe with a diameter equal to the crucible opening terminates in a small distance above the crucible opening.

The cathode and anode are preferably made of tungsten. To generate an arc between the crucible and the raw material inside the crucible, respectively, and the anode spaced apart from the latter, the cathode and the anode are connected to a power source.

The arc reactor is characterized in that its housing has at least one inlet for cooling gas, which is directed at the crucible, and in particular at the interstice that is formed by the distance between the crucible and the hood. The at least one inlet for cooling gas can be formed e.g. of two or more inlets for cooling gas that are disposed symmetrically around a common axis of symmetry of the crucible and the hood and optionally are directed at the common axis of symmetry. Preferably, an inlet for cooling gas has a feed line for cooling gas which runs along the cathode. In the process, nanoparticles are formed from the raw material melt by means of the arc plasma that is generated between the crucible and the raw material melt contained therein, respectively, and the anode. It is presently assumed that an inlet for cooling gas influences the formation of nanoparticles in the plasma through a more rapid cooling.

It has shown in the process for the production with the apparatus that feeding cooling gas into the interstice that is formed by the spacing of the crucible opening and the hood adjusts the size of nanoparticles produced. In general, it has shown that a higher cooling gas flow results in smaller particle sizes.

The carrier gas flow that flows through the carrier gas feed around the crucible and, after passing through the interstice formed by the spacing of the crucible opening and the hood, flows into the hood and through the exhaust pipe to the carrier gas outlet, transports nanoparticles generated from the raw material melt between the crucible and the hood or cathode. After flowing through the carrier gas outlet, the nanoparticles can be separated from the exhaust gas, e.g. by means of a filter, e.g. a ceramic filter. The carrier gas feed can comprise a compressor in order to convey the carrier gas flow into the reactor housing. Alternatively or additionally, a vacuum source, e.g. the suction side of a compressor, can be connected to the carrier gas outlet to suck the exhaust gas from the carrier gas outlet. Preferably, the device has precisely one compressor that is connected to the carrier gas feed and to the carrier gas outlet.

The cross-section of the exhaust pipe is at maximum equal to the terminal cross-section of the hood, preferably the exhaust pipe has an inner diameter of at maximum 0.5-fold, more preferably at maximum 0.3-fold or at maximum 0.2-fold the terminal cross-section of the hood. A smaller cross-section of the exhaust pipe relative to the terminal cross-section of the hood enables a flow velocity of the exhaust gas within the exhaust pipe which is sufficient for the transport of said nanoparticles, wherein low volumetric flows of the carrier gas are sufficient. Therefore the hood that is connected to the carrier gas outlet by means of the exhaust pipe allows low losses by adsorption of nanoparticles and an effective transport of the nanoparticles out of the housing, preferably at a low volumetric flow of the carrier gas.

The process preferably allows the production of nanoparticles in the exhaust gas flow that emerges from the carrier gas outlet of the reactor, by means of an arc with low specific energy input, e.g. lower than in a process using an apparatus having no exhaust pipe or an exhaust pipe that has no hood.

The process allows production rates of 5 g/h for copper nanoparticles($Cu^0$) of the average size of 80 nm at a specific energy consumption of about 100 kWh/kg. It has shown that without a hood larger particles are produced, which is attributed to lower carrier gas velocities which are generated without a hood. At the same time the exhaust pipe and the hood allow a higher production rate and thus a lower power consumption than an apparatus without a hood because the hood significantly reduces particle losses in the reactor housing.

Using the apparatus having a crucible in a housing, the following results can be achieved in the process: For pure zinc as a raw material, 13 g/h can be achieved at 200 nm mean particle size at an efficiency of 20 kWh/kg. Nanoparticles of titanium nitride (TiN as raw material) can be produced with a mean size of 18 nm to 300 mg/h at an efficiency of 2.6 kWh/g, silver nanoparticles ($Ag^0$ as raw material) having a mean size of 100 nm at a production rate of 1 g/h and at an energy efficiency of 900 kWh/kg. Therein, solely the electric energy used to generate the arc is calculated for energy efficiency.

Preferably, a cooling device is disposed in the feed line of the carrier gas and/or cooling gas. The carrier gas flow and cooling gas flow may have the same temperature. Carrier gas and cooling gas may be the same gas. Preferably, the exhaust gas after separation of nanoparticles is returned to the reactor as a carrier gas and cooling gas, in particular after cooling the exhaust gas, e.g. in a common cooling device, and splitting of the exhaust gas into carrier gas and cooling gas. The cooling device and the pipes, respectively, are adapted to bring the exhaust gas to a temperature that permits the removal of heat from the plasma generated between the crucible and raw material melt, respectively, and cathode, which plasma can have a temperature of approx. 8,000 up to 10,000K, at recirculation of the exhaust gas as the carrier gas and cooling gas, in particular after separating off of the nanoparticles.

Preferably, the housing of the reactor is connected gas-tight to an outlet pipe connected to the carrier gas outlet, to a feed line for carrier gas connected to the carrier gas inlet, to a cooling gas line connected to the inlet for the cooling gas, to a reservoir for the raw material and to a conveying device having a supply conduit for raw material disposed between the reservoir and the reactor, optionally to a separation device disposed between the exit pipe and the feed line for the carrier gas for the separation of nanoparticles from the exhaust gas and optionally connected to a cooling device disposed between the separation device and the feed line for carrier gas, so that the reactor is gas-tight with the aforementioned elements. In this embodiment, the reactor in a simple manner allows a constant composition of the carrier gas and cooling gas, e.g. a constant non-oxidizing gas composition for carrier gas and cooling gas and, e.g. before operation, a simple evacuation or gas flushing and subsequent filling with a carrier gas.

The raw material is preferably in the form of granules, e.g. for metals, in particular $Cu^0$, or metal alloys having a grain size of approx. 0.5 to 2 mm.

The reservoir can be sealable in a gas-tight manner, so that before evacuation or gas flushing and complete filling of the reactor with carrier gas it is filled with raw material, in particular raw material granules and can be evacuated or gas-flushed after gas-tight sealing together with the reactor. The size of the reservoir is to be adapted only to the planned throughput of the process.

For a simple filling of the crucible during the process, the reactor preferably has a supply conduit for raw material, which preferably opens into the second end of the exhaust pipe, which is opposite the hood. This embodiment allows the guidance of raw materials, particularly raw material granules, through the supply conduit and the exhaust pipe into the crucible. It has shown that the feed of raw material granules during the process through the exhaust pipe does not affect the process stability and permits a continuous process, in the preferred embodiment up to the conversion of the raw material that was contained in the reservoir.

A preferred conveying device for granules is controlled and including its electric drive motor is enclosed gas-tight by a housing that is connected gas-tightly to the reactor, so that only electrical lines for the drive motor are guided through the housing. This embodiment avoids the gas-tight passage of movable elements, e.g. a drive shaft, through the housing wall.

A preferred conveying device comprises a rotor, which is disposed below a passage, which is connected with the reservoir for raw material. The rotor has a surrounding circumferential surface that is rotatably disposed about an approximately horizontal axis, and is driven by the drive motor. It has shown, e.g. with metal granules, that the adhesive friction to the rotor is sufficient to move granules over the upper apex. Therefore, the rotor is rotatably disposed within a housing section that is disposed on a first side of the upper apex of the rotor in a smaller distance from the rotor than the diameter of the granules. The rotor is driven with a rotational direction from the first side over its upper apex to the opposite second side. On the second side of the upper apex of the rotor, the housing section is disposed at a greater distance from the circumferential surface of the rotor than the diameter of the granules, so that the granules are moved by the rotor to the second side of the apex and subsequently moved by gravity along the housing section of the second side. Accordingly, in particular on the second side from the upper apex, the rotor is disposed at a spacing from the housing section that is in particular adapted to allow the passage of raw material granules. This conveying device has the advantage of conveying the granules in a controlled manner without blocking.

In a preferred embodiment, at least two arc reactors are comprised in an arrangement having in common a reactor housing which contains the elements of an arc reactor in adjoining sections, so that a reactor housing forms a section each of the common reactor housing of the assembly. This arrangement of reactors in a common reactor housing, each with the elements for each pair of anode and cathode has the advantage of a high process stability, because in case of failure or fault of one element, only the reactor connected thereto is disturbed and the other reactors remain unaffected. The elements for each pair of anode and cathode are in particular the crucible connected to the anode, the carrier gas feed, the at least one inlet for cooling gas directed towards the interstice between the crucible and the hood, the hood arranged at a spacing from the crucible, which hood is held by means of the exhaust pipe and is connected to the carrier gas outlet, the outlet pipe which is connected to the carrier gas outlet, the feed line for carrier gas which is connected to the inlet for carrier gas, the cooling gas line connected to the inlet for cooling gas, the reservoir for the raw material and the conveying device disposed between the reservoir and the reactor having a supply conduit for raw material, and the power source. Preferably, the arrangement comprises a separating device in common for extracting nanoparticles from the exhaust gas which is disposed between the outlet pipes and the feed lines for the carrier gas, and further preferred a cooling device in common for the carrier gas which is disposed between the separating device and the feed lines for the carrier gas. As a power source for a reactor and for each pair of an anode and cathode, respectively, e.g. a welding transformer each is suitable, such as one that is available for tungsten inert gas welding.

For the arrangement of at least two arc reactors, it is preferred that a vertical outlet pipe, preferably with a circular internal cross-section is attached to each carrier gas outlet. Two vertical outlet pipes each are connected to a horizontal primary connecting pipe disposed above the reactor or above the outlet pipes, which preferably has a rectangular, e.g. square, internal cross-section, and to which a secondary outlet pipe is connected respectively above and/or opposite the side to which the outlet pipes are connected, which preferably at least in sections runs vertically. For four or more arc reactors in an arrangement it is preferred that between each two of the primary connecting pipes and the secondary outlet pipe a horizontal secondary connecting pipe is disposed, the outlet of which is disposed on the side opposite the connection to primary connecting pipes and at the same distance to the connecting pipes. For the arrangement is preferred that two vertical outlet pipes each are symmetrically connected to a primary horizontal connecting pipe having an outlet symmetrically to the connections of the outlet pipes, wherein in turn the outlets of two primary connection pipes each are connected symmetrically to one horizontal secondary connection pipe disposed above, the outlet of which is disposed symmetrically in relation to the connections of the outlets of the primary connecting pipes. It has shown that the symmetrical connection of two outlet pipes each of the reactors to are connecting pipe and the symmetrical connection of two connecting pipes each to a further horizontal connecting pipe, conveys a regular and equal exhaust gas flow and/or carrier gas flow through the reactors of an arrangement. It is generally preferred that the pipes, by which a carrier gas outlet each is connected to a common exhaust pipe leading to a separating device, each have the same flow resistance. The vertical arrangement of the outlet pipes in combination with the horizontal arrangement of the connecting pipes preferably results in a greater homogeneity of the nanoparticles separated off of the exhaust gas or carrier gas at the separating device, in particular using a rectangular internal cross-section of the connecting pipes. For this, it is presently assumed that larger and/or agglomerated nanoparticles are separated off the gas flow when flowing through the vertical outlet pipes and horizontal connecting pipes.

For the arrangement of at least two arc reactors it is preferred that each feed line for carrier gas is connected to a common carrier gas line, wherein each feed line has the same flow resistance, e.g. by the same length and the same internal cross-section of the feed lines each from a common distributor between a common carrier gas line and the feed lines for carrier gas.

For the arrangement of at least two arc reactors, it is preferred that each inlet for cooling gas is connected to a common cooling gas line, by means of a feed line wherein each feed line has the same flow resistance. The common cooling gas line can branch off, e.g. from the common carrier gas line, so that the carrier gas and cooling gas entirely consist of recycled and preferably cooled exhaust gas. The arc reactor or an arrangement of at least two arc reactors can therefore have a circulation for exhaust gas to the carrier gas and cooling gas.

In the common exhaust pipe, preferably in the common carrier gas line, a compressor is preferably disposed to convey the exhaust gas separated from nanoparticles as a carrier gas, preferably the carrier gas and the cooling gas, to the carrier gas feeds and cooling gas feed lines, respectively.

The feed lines for cooling gas and/or the feed lines for the carrier gas preferably have no flow regulator.

As a particular advantage, it has shown that the arrangement preferably has no flow regulator neither on the exhaust pipe between the reactors of an arrangement and a separating device, nor between the separating device or cooling device and carrier gas feeds.

The reactor and the arrangement of the reactors have the advantage of a simple design, which moreover allows a continuous stable process for the production of nanoparticles with good energy efficiency.

For metallic copper as raw material, nitrogen is preferred as carrier gas and cooling gas; for silicon as raw material, argon is preferred as carrier gas and cooling gas; for aluminum as raw material, a mixture of argon and hydrogen is preferred as carrier gas and cooling gas. For raw materials that do not form nitrides in the arc reactor in a nitrogen atmosphere, nitrogen is generally preferred as carrier gas and as a cooling gas.

The work leading to this invention received funding support from the European Union Seventh Framework Programme (FP7/2007-2013) under grant agreement version No. 6 from 24.1.2011 under the funding number 280765 (BUONAPART-E).

The invention will now be described in more detail by way of examples and with reference to figures, schematically in FIG. 1 an arc reactor according to the invention, FIG. 2 an exhaust pipe in longitudinal section, FIG. 3, the exhaust pipe of FIG. 2 in plan view, FIG. 4 a flat element of a carrier for an exhaust pipe, FIG. 5 a ring of a carrier for an exhaust pipe, FIG. 6 a hood in longitudinal section, FIG. 7 a common housing of an arrangement of reactors in plan view, FIG. 8 a longitudinal section through outlet pipes and connecting pipes for a common housing of an arrangement of reactors, FIG. 9 a longitudinal section through a distributor for carrier gas, FIG. 10 a plan view of the distributor of FIG. 9, FIG. 11 a longitudinal section through a conveying device with connected supply conduit for raw material, FIG. 12 a detail of FIG. 11 turned by 90° in relation to FIG. 11, FIG. 13 a schematic overview of an arrangement of eight arc reactors in one plant, FIG. 14 a result of the XRD measurement for determination the purity of the particles, and FIG. 15 a scanning electron microscopic (SEM) image showing the copper particles generated.

FIG. 1 shows an arc reactor in a section through the housing 1 having a carrier gas feed 2, through which a carrier gas flow 2 enters into the housing 1. The crucible 3 is made of graphite, and is held by an anode 4, which engages in a bore of the crucible 3. The crucible 3 has a taper below its crucible opening 5 to reduce the thermal conduction from the crucible opening 5 to the anode 4. A cathode 6 made of tungsten is disposed at a distance above the crucible opening 5. At a spacing above the crucible 3 a hood 7 is disposed, which is held by the exhaust pipe 8. By means of the exhaust pipe 8 the hood 7 is connected to the carrier gas outlet 9, which is disposed above the crucible opening 5 and opposite the carrier gas feed 2 and through which carrier gas outlet 9 the carrier gas laden with nanoparticles and cooling gas exit from the housing 1 as exhaust gas.

The exhaust pipe 8, the hood 7, the crucible 3 and the anode 4, and preferably also the carrier gas feed 2 and the opposite carrier gas outlet 9 are disposed on a common axis that is vertical and in accordance to the preferred embodiment are each formed symmetrical about this axis.

The exhaust pipe 8 carries the hood 7 held by a terminal circumferential protrusion 12 disposed on its first end 11, on which the hood 7 rests with its small opening. Opposite its small opening the hood 7 has a terminal circular cross-section 14, which is larger than the crucible opening 5 by about a factor of 2.4. The exhaust pipe 8 is arranged at its second end 13 opposite its first end 11, spaced from the housing 1 and from the outlet pipe 10, which is connected gas-tight to the housing 1. The exhaust pipe 8 is connected at its second end 13 in accordance with the preferred embodiment with small contact surfaces for thermal conduction to the housing 1 and to the outlet pipe 10, respectively, in that a flat element 15 having a U-shaped recess engages in recesses 16 at the second end 13 of the exhaust pipe 8 and at a distance therefrom rests on a protrusion 17 that projects over the inner wall of the exit pipe 10 and is e.g. annular. Such a protrusion 17 is preferably formed by a ring 23 that is disposed gas-tight at a flange connection 18 of the outlet pipe 10. It has shown in the process using the apparatus according to the invention that such an arrangement of the exhaust pipe 8 to the outlet pipe 10, which is connected to the housing 1, results in a low thermal conduction to the outlet pipe 10, so that the exhaust pipe 10 can optionally be without a cooling jacket. Supporting the exhaust pipe 8 by a flat element 15, which rests on a protrusion 17, which is disposed on a flange 18 of the outlet pipe 10, permits a simple structure and easy mounting of the exhaust pipe 8 and of the hood 7 held at a first end thereof within the housing 1 and within the outlet pipe 10, respectively.

The housing 1 has an inlet 19 for cooling gas, which is directed to the space between the crucible opening 5 and the cathode 6, which is disposed with a spacing from the crucible, in particular above the crucible opening 5. An inlet 19 for cooling gas is shown, which is mounted as an inlet on the housing 1, through which also the cathode 6 is lead, as well as an inlet 19 as an alternative at which a feed line 21 for cooling gas extends along the cathode 6 in accordance with the preferred embodiment.

FIG. 2 in detail shows a preferred exhaust pipe 8 in Section A-A of FIG. 3, which at its second end 13 has the recesses 16, which preferably are circumferential for engaging a flat element 15. At the first end 11 of the exhaust pipe 8, a circumferential protrusion 12 is integrally formed, on which can rest the small opening of a hood 7.

FIG. 4 shows a preferred flat element 15 with its parallel edges 22 of its recess inserted in opposite sections of the recesses 16 of the exhaust pipe 8. The flat element 15 may e.g. have a thickness of 1 to 3 mm.

FIG. 5 in plan view shows a ring 23 that forms a protrusion 17 as a carrier for the outer edge region of the flat element 15. The ring 23 preferably has a circumferential outer groove 24 in which a sealing ring is inserted, so that the ring 23 when disposed in a flange connection 18 maintains the gas-tightness of the flange connection and within the vertical outlet pipe 10 forms a horizontal carrier 25 for the flat element 15. The view rotated by 90° shows the groove 24 for receiving a sealing ring.

FIG. 6 shows a hood 7 in a section along its central axis. The terminal hood section 14 is spanned by walls 26, which preferably converge conically to an opposite smaller opening 27, to which a circumferential edge 28 connects, which lies against the protrusion 12 at the first end of the exhaust pipe 8 to hold the hood 8 from the first end of the exhaust pipe 8.

FIG. 7 shows a housing 1 which forms the common housing 1 for an arrangement of eight arc reactors. The carrier gas feeds 2, the inlets 19 for cooling gas and the flange connections 18 for the outlet pipes 10 for each of the arc reactors disposed in the common housing 1 are each disposed in parallel.

FIG. 8 shows a preferred arrangement of the outlet pipes 10, which are preferably disposed vertically and each form a flange connection 18 to the common housing 1 of the arrangement of reactors according to FIG. 7. Two outlet pipes 10 each are connected to a horizontally disposed primary connecting pipe 29. The outlet 30 of the primary connecting pipe 29 is disposed opposite the connections of the outlet pipes 10 and disposed in each case at the same distance from the latter. Two outlets 30 each of primary connecting pipes 29 are connected to a secondary connecting pipe 31 connected opposite the outlet pipes 10, wherein the outlet 32 of the secondary connecting pipe 31 is disposed at the same distance in each case to the connections of the outlets 30 of the primary connecting pipes 29. Two outlets 32 each of secondary connecting pipes 31 are connected a tertiary connecting pipe 33, of which the opposite outlet 34 is arranged opposite the connections of the outlets 32 of secondary connecting pipes 31 and is disposed each time in equal distance to these. In the arrangement, a common outlet pipe 35 is preferably connected the outlet 34.

The symmetrical connection of two outlet pipes 10 each to a primary connecting pipe and the symmetrical connection of the outlets of two outlets each to a downstream connecting pipe up to the connection to a common outlet pipe 35 enables the same flow resistance in each outlet pipe 10.

The plan view of FIG. 10 and the sectional view along B-B shown in FIG. 9 show a gas distributor 36 for carrier gas that connects each feed line for carrier gas of an arrangement of four reactors of an arrangement of reactors in a common housing to a common carrier gas line, so that each feed line has the same flow resistance. The gas distributor 36 on its housing has connections 38 for the carrier gas feeds, wherein the connections 38 are disposed on the gas distributor 36 symmetrically with respect to a connection for a common carrier gas line 37.

The feed lines for cooling gas can be connected to the common carrier gas line by means of a corresponding gas distributor.

In particular in conjunction with the connection of the outlet pipes 10, each having the same flow resistance, to a common outlet pipe 35, the apparatus allows an effective process for the production of nanoparticles, since losses in the common housing 1 due to deposition of nanoparticles are low, which e.g. can be caused inside the housing 1 by carrier gas flows which are not directed into the hood 7.

FIG. 11 shows a reservoir 40 for raw material that can be connected gas-tightly with the housing 1 of the reactor, enclosing with the housing 1 a common gas space. The raw material can be fed into the crucible opening 5 by means of a supply conduit 42 for raw material, which opens into the second end of the exhaust pipe 8. Preferably, a conveying device 43 for raw material is connected gas-tight between the reservoir 40 and the supply conduit 42, which conveying device 43 is especially suitable for conveying raw material granules 41. The conveying device 43, which is shown in section in FIG. 12, rotated at 90° in respect to FIG. 11, has a rotor 45 rotatable below the reservoir 40 about an approximately horizontal axis, which rotor 45 is disposed in the housing section arranged on a first side 46 from the upper apex 47 of the rotor in a smaller distance from the rotor 45 than the diameter of the raw material, e.g. of the granules 41. The housing section on the second side 48 opposite the first side 46 is disposed at a greater distance from the rotor 45 than the diameter of the raw material, in order to form a free passage for the raw material, as indicated by the arrows between the exemplary raw material granules 41. The direction of rotation of the rotor 45 from the first side through its apex 47 to the second side 48 in FIG. 12 is indicated by the arrow in the rotor 45. For supply of raw material to the first side 46 a passage 49 is disposed between the reservoir 40 and the rotor 45, which passage 49 is e.g. formed by a recess in a disc 50 rotatable on the housing section.

FIG. 11 also shows that the drive motor 51 of the rotor 45 may be enclosed gas-tight within a housing that is connected gas-tight with the housing section in which the rotor is disposed, wherein only the electric lines 52 for the drive motor 51 but no moving elements are lead through the housing. Herein, a holding plate 53 that holds the drive motor 51 inside the housing is provided with openings through which the housing section in which the drive motor 51 is disposed can be evacuated and provided with a carrier gas atmosphere, respectively. Preferably, the holding plate is clamped in a gas-tight manner in a flange connection 54 between two housing parts.

FIG. 13 shows an overview of an arrangement of eight reactors in a common housing 1, in which eight crucibles 3, each are mounted on an anode 4 and arranged with a spaced cathode 6, each having a carrier gas feed 2 below the crucibles 3, each crucible 3 having at least one inlet for cooling gas 19 directed towards the space between crucible 3 and cathode 6, each with a cooling gas feed line 21. Representatively, in the common housing 1 only for one reactor there is shown the crucible 3 on the anode 4 with cathode 6, inlet for cooling gas 19 on the cooling gas line 21 below the hood 7 on the exhaust pipe 8. The carrier gas feeds 2 are connected to a common carrier gas line 37 by means of a gas distributor 36, and the cooling gas feed lines 21 are connected to the common carrier gas line 37 by means of a gas distributor 36. The carrier gas feeds are each connected to the common carrier gas line 37 having the same flow resistance. The cooling gas feed lines 21 are each connected with the same flow resistance to the common carrier gas line 37.

The hoods 7 disposed with a spacing above each crucible 3 are each held by one exhaust pipe 8 at the first end 11 thereof, which is attached at its opposite second end 13 to an outlet pipe 10. The outlet pipes 10 are connected to a common outlet pipe 35 by means of connecting pipes 29, 31, 33, so that each outlet pipe 10 has the same flow resistance towards the common outlet pipe 35. The common outlet pipe 35 and the common carrier gas line 37 are connected to each other, wherein between these there are connected a compressor 55 for gas pumping, a separating device 56 for separating the nanoparticles off the exhaust gas and a cooling device 57 for cooling the gas flow.

LIST OF REFERENCE SIGNS

Figure 1:
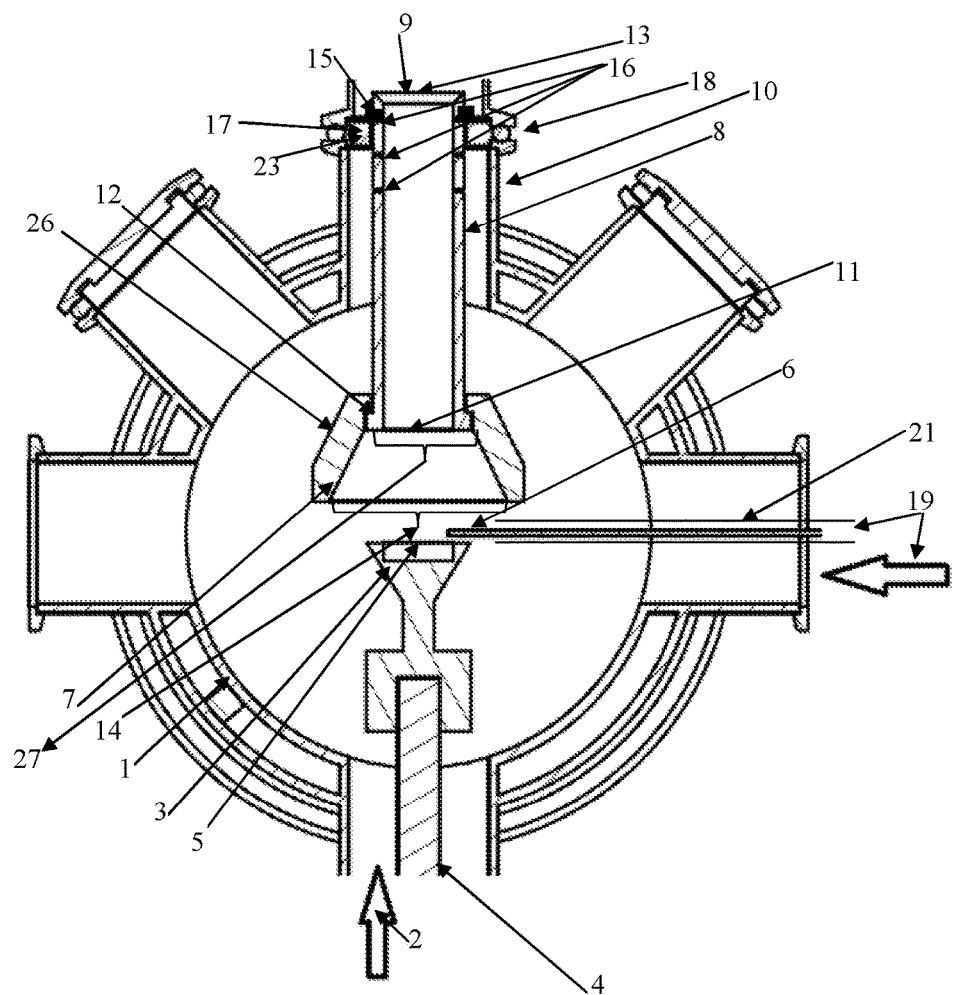
Figure 2:
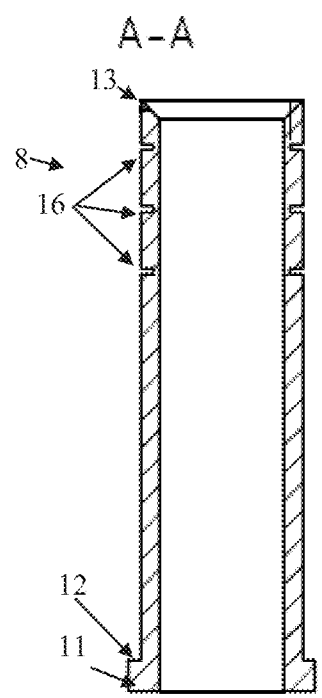
Figure 3:
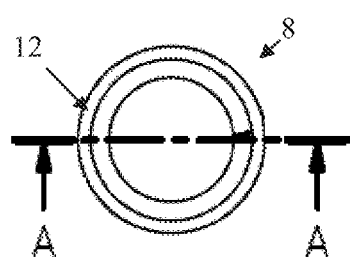
Figure 4:
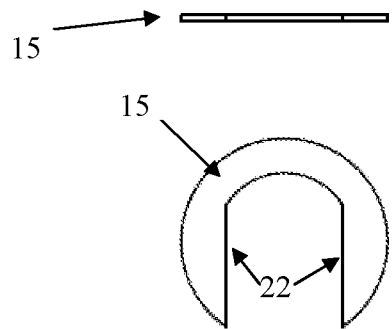
Figure 5:
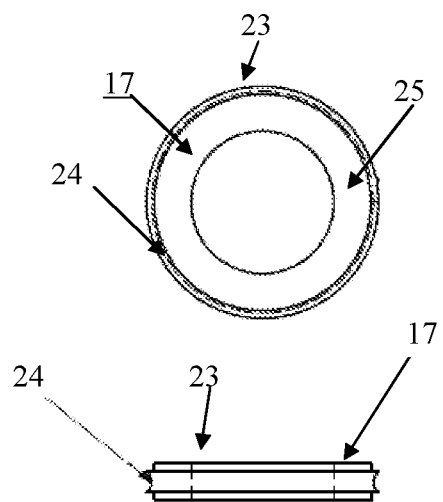
Figure 6:
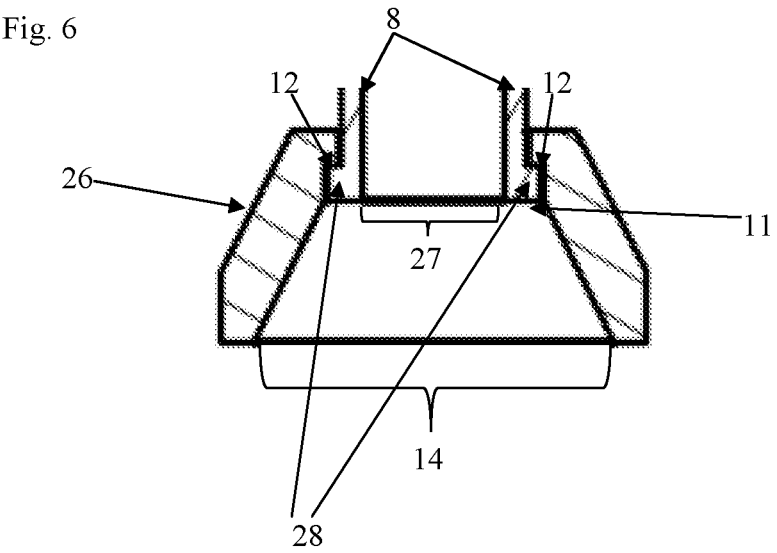
Figure 7:
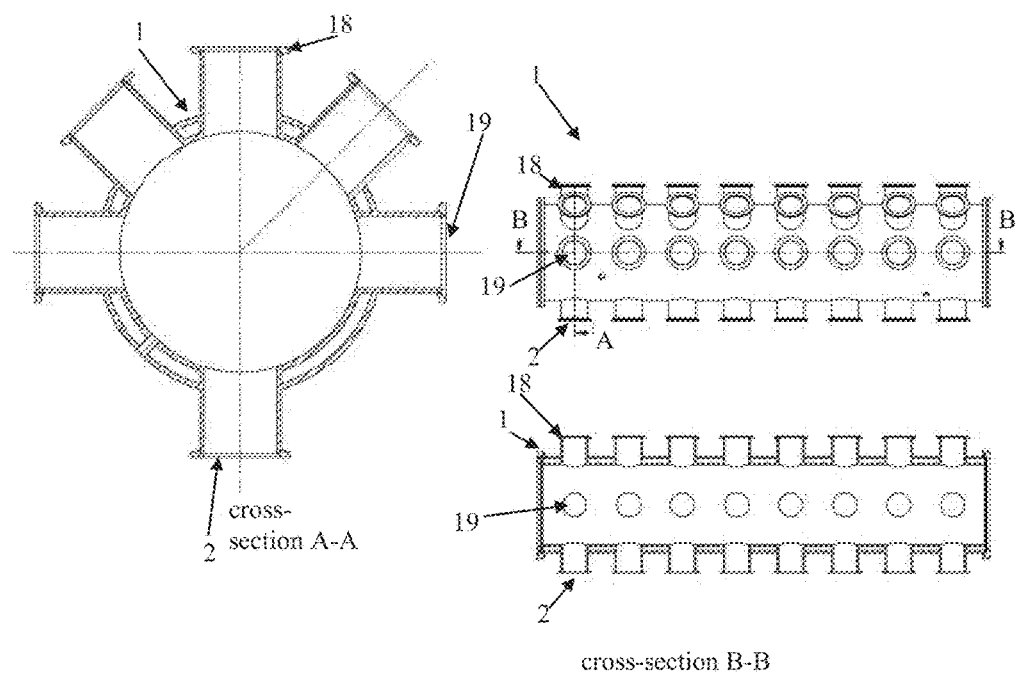
Figure 8:
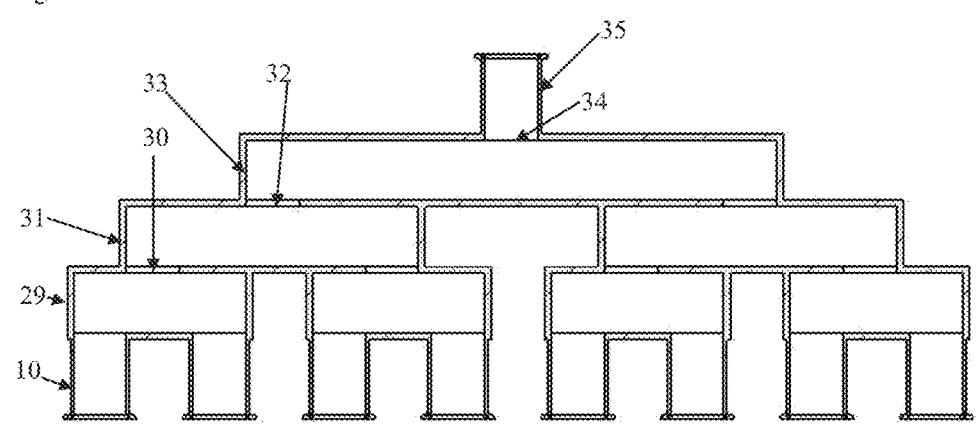
Figure 9:
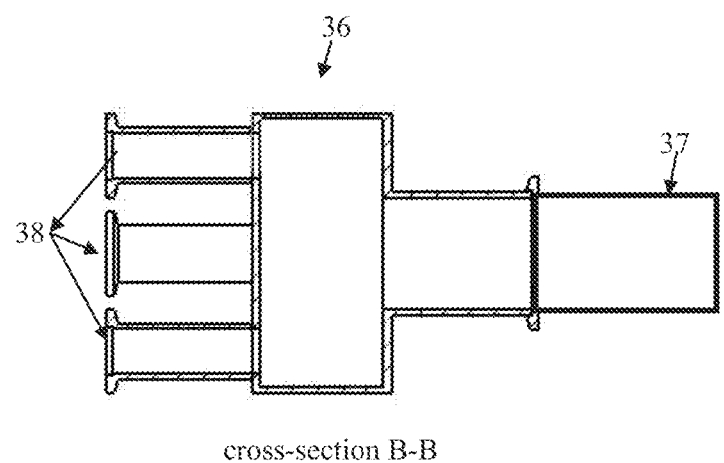
Figure 10:
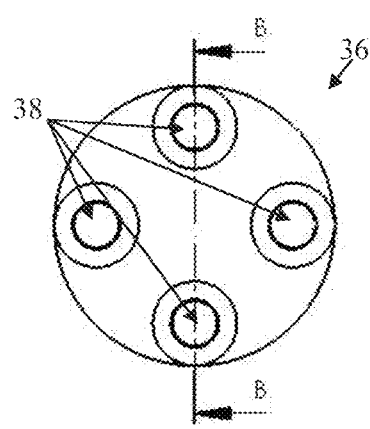
Figure 11:
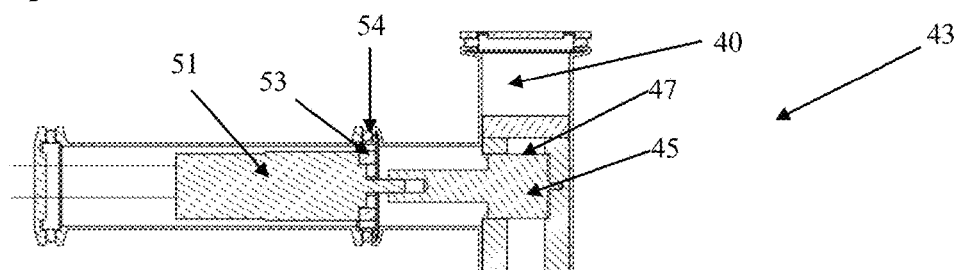
Figure 12:
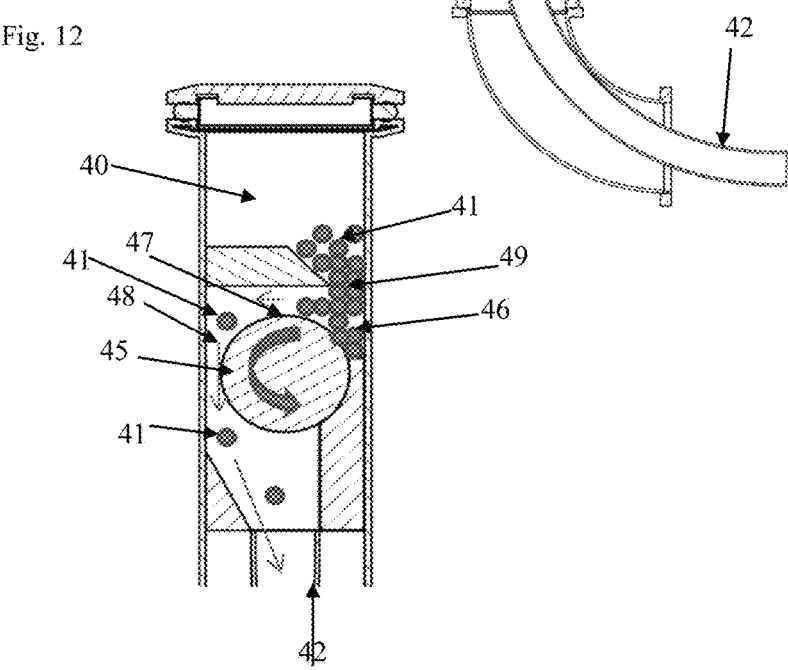
Figure 13:
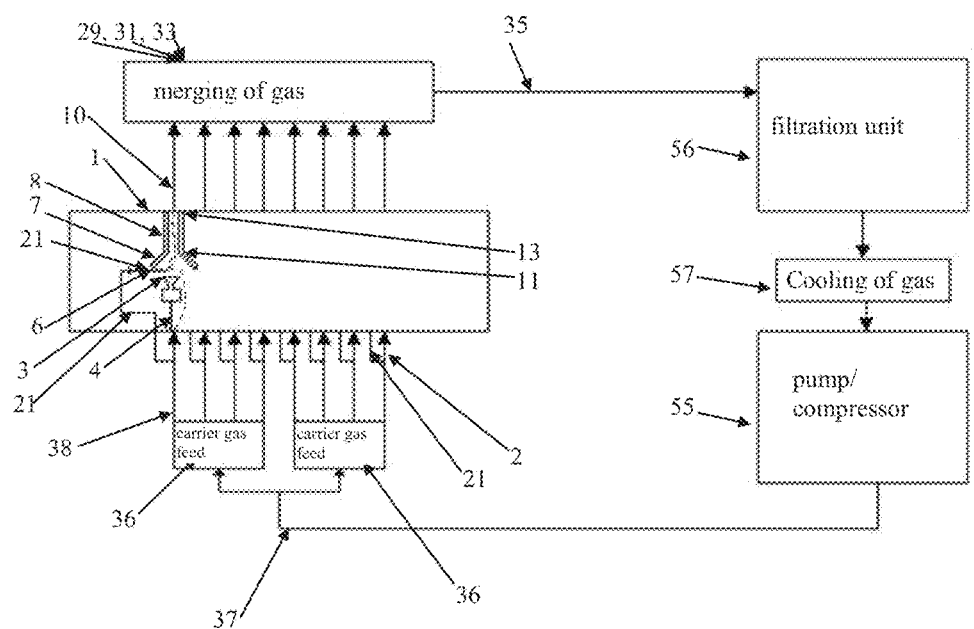
Figure 14:
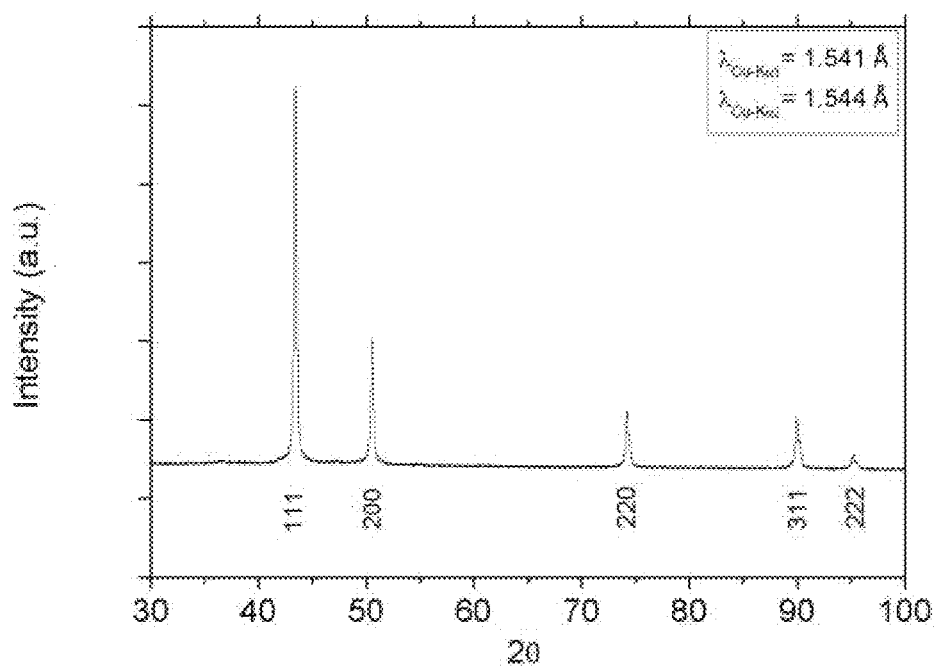
FIG. 14 shows the result of an X-ray diffraction analysis (XRD) of the nanoparticles produced from pure copper using an apparatus according to FIG. 1. The reflection peaks of the measurement are attributed clearly to the lattice structure of copper and show no evidence of copper oxide.
Figure 15:
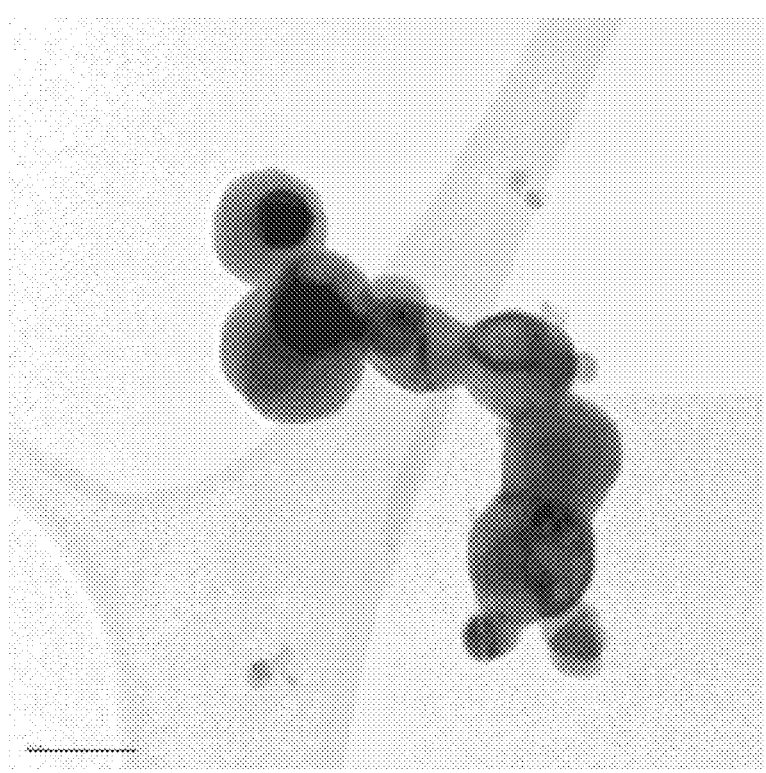
FIG. 15 shows a scanning electron microscopic (SEM) image of the produced copper nanoparticles, the bar has a length of 100 nm. The average size of copper particles of 80 nm was determined both by different measuring techniques and by counting in SEM images.

| | |
|---|---|
| 1 | reactor housing |
| 2 | carrier gas feed |
| 3 | crucible |
| 4 | anode |
| 5 | crucible opening |
| 6 | cathode |
| 7 | hood |
| 8 | exhaust pipe |
| 9 | carrier gas outlet |
| 10 | outlet pipe |
| 11 | first end of the exhaust pipe |
| 12 | protrusion |
| 13 | second end of the exhaust pipe |
| 14 | terminal hood cross-section |
| 15 | flat element |
| 16 | recess |
| 17 | protrusion |
| 18 | flange connection |
| 19 | inlet for cooling gas |
| 21 | feed line for cooling gas |
| 22 | edges of the flat element |
| 23 | ring |
| 24 | circumferential groove |
| 25 | carrier |
| 26 | walls of the hood |
| 27 | smaller opening of the hood |
| 28 | edge |
| 29 | primary connecting pipe |
| 30 | outlet of the primary connecting pipe |
| 31 | secondary connecting pipe |
| 32 | outlet of the secondary connecting pipe |
| 33 | tertiary connecting pipe |
| 34 | outlet of the tertiary connecting pipe |
| 35 | common outlet pipe |
| 36 | gas distributor |
| 37 | common carrier gas line |
| 38 | connection for carrier gas feed |
| 40 | reservoir |
| 41 | raw material granule |
| 42 | supply conduit for raw materials |
| 43 | conveying device |
| 45 | rotor |
| 46 | first side |
| 47 | apex |
| 48 | second side |
| 49 | passage |
| 50 | disc |
| 51 | drive motor |
| 52 | electrical line |
| 53 | holding plate |
| 54 | flange connection |
| 55 | compressor |
| 56 | separating device |
| 57 | cooling device |

The invention claimed is:

1. Arrangement of at least two arc reactors for producing nanoparticles from a raw material melt comprising: a common housing of the at least two arc reactors, a crucible in the common housing, the crucible being connected to an anode, and a cathode spaced a distance away from an opening of the crucible, the common housing comprising a carrier gas inlet for each of the at least two arc reactors entering into the housing below the crucible, and a carrier gas outlet for each of the at least two arc reactors exiting above the crucible, wherein at a distance above the crucible there is disposed a hood separated from the crucible, a terminal cross-section of which hood spans at least over the opening of the crucible, the hood being connected to the carrier gas outlet by an exhaust pipe and the housing having at least one inlet for cooling gas directed towards an interstice between the crucible and the hood, wherein at least two carrier gas outlets of the at least two arc reactors are each are connected by a vertical outlet pipe to a common horizontal primary connecting pipe disposed above the vertical outlet pipes, the primary connecting pipe having a secondary horizontal outlet pipe connected between the outlet pipes and disposed above the primary connecting pipe; wherein at least two of the carrier gas inlets are connected to a common carrier gas line, from which feed lines branch off to each of the at least two carrier gas inlets, wherein the feed lines each have the same flow resistance and the same internal cross-section and no flow controller, and wherein the outlet pipes are connected to a common outlet pipe, which is connected to a separating device for the separation of nanoparticles from gas, and the separating device has a gas outlet that is connected to a cooling device for gas, the gas outlet of which is connected to the common carrier gas line.

2. Arrangement of at least two arc reactors according to claim 1, comprising a conveying device for raw material granules, which below a passage connected to a reservoir for raw material granules has a rotor having a rotary circumferential surface that is driven by a controlled motor about an approximately horizontal axis of rotation, wherein the passage is disposed above the rotor adjacent to its upper apex and the rotor is disposed within a first housing section, which is disposed at a smaller distance from the circumferential surface and in relation to the upper apex the housing section on an opposite second side of the rotor is disposed at a greater distance from the circumferential surface of the rotor.

3. Arrangement of at least two arc reactors according to claim 1, wherein the at least one inlet for cooling gas is connected with a feed line for cooling gas disposed along the cathode.

4. Arrangement of at least two arc reactors according to claim 1, wherein the common housing is gas-tight, and a reservoir for raw material granules, a supply conduit for raw material granules and between the reservoir and a feed line, and a controlled conveying device for raw material granules including its drive motor are connected to the common housing in a gas-tight manner.

5. Arrangement of at least two arc reactors according to claim 1, wherein the at least one inlet comprises at least two inlets for cooling gas, of which one each is directed towards the crucible, are connected with a common cooling gas line, from which the feed lines branch off to each of the inlets for cooling gas, wherein the feed lines each have a same flow resistance and no flow controller.

6. Arrangement of at least two arc reactors according to claim 1, comprising a plurality of anodes and cathodes, wherein for each anode connected with the crucible and each cathode disposed on the same crucible there is a separate power source.

* * * * *